Dec. 24, 1940.   P. J. McCULLOUGH   2,226,437
ELECTRICALLY HEATED CONTAINER
Filed Aug. 4, 1939
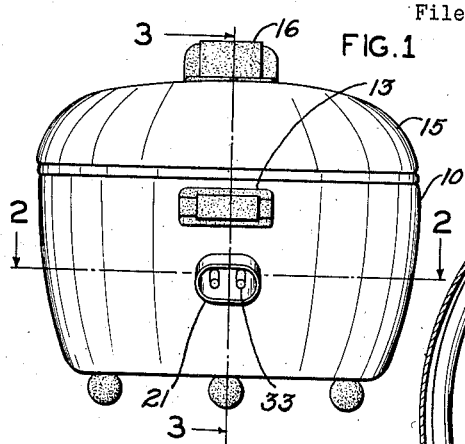
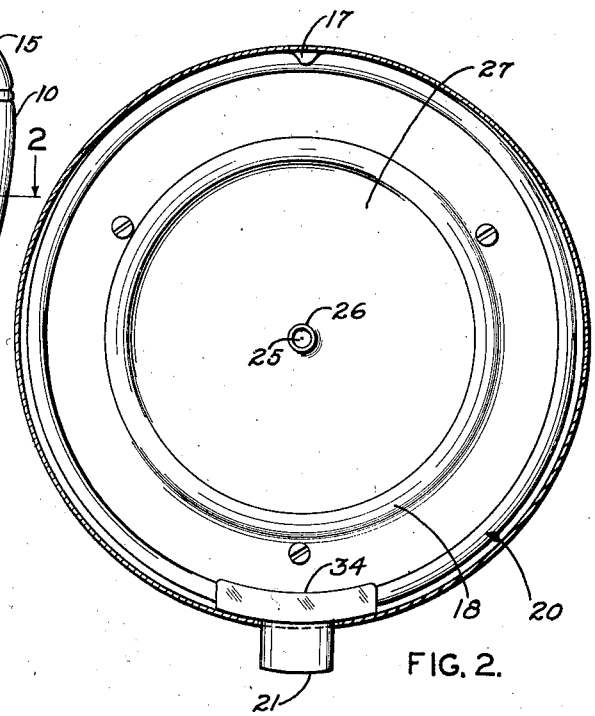
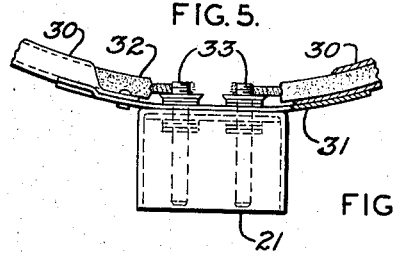
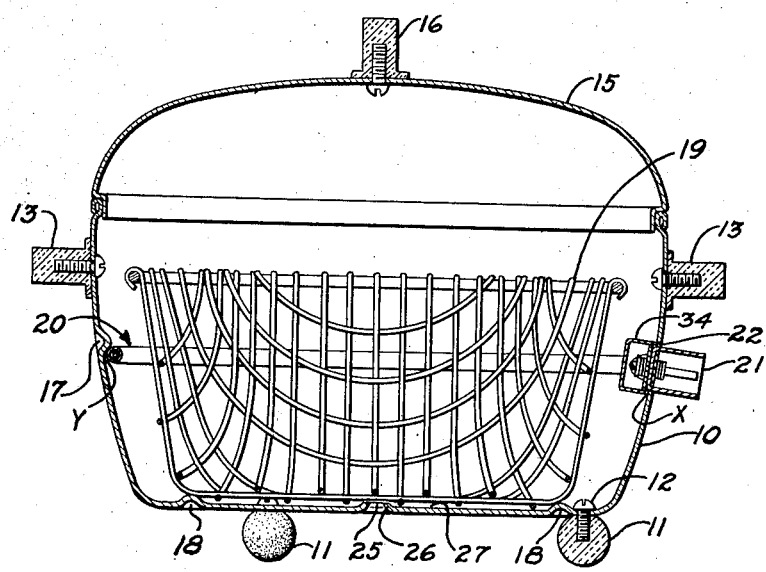
INVENTOR
PAUL J. McCULLOUGH
BY Rodney Bedell
ATTORNEY.

Patented Dec. 24, 1940

2,226,437

UNITED STATES PATENT OFFICE 2,226,437

ELECTRICALLY HEATED CONTAINER

Paul J. McCullough, St. Louis, Mo., assignor to Joseph Pavelka, St. Louis, Mo.

Application August 4, 1939, Serial No. 288,305

8 Claims. (Cl. 219—44)

The invention relates to electrically heated cooking or food containers as, for example, bun warmers which are a popular item of kitchen ware today.

One of the objects of the invention is to provide a simple electrical heating apparatus for a bun container which will require a minimum of work on the body of the container.

Another object of the invention is to provide an article of the type referred to with an electric heating unit which may be readily removed from the vessel so that the latter may be thoroughly cleaned in water without short circuiting the electric conduit.

These and other detailed objects of the invention are attained by the structure illustrated in the accompanying drawing in which—

Figure 1 is a side elevation of a complete container embodying the invention.

Figure 2 is a horizontal section taken on the lines 2—2 of Figure 1.

Figure 3 is a vertical section taken on the lines 3—3 of Figure 1.

Figure 4 is a detail top view.

Figure 5 is a detailed end view of the plug receiving portion of the electrical heating unit.

In the drawing, 10 indicates the body portion of the container that is supported on leg members 11 attached by screws 12. Body portion 10 is equipped with handles 13 of a slow heat conducting material. Lid 15 is constructed to fit loosely on to container body 10, and is provided with a slow heat conducting handle 16.

An annular heating unit indicated generally at 20 is supported at one side of the container by the terminal shield 21, which projects through an opening 22 in the side wall of the container, and is supported at the other side of the container by contact of the ring with the downwardly and inwardly inclined wall of the container. The ring is slightly oval (see Figure 2) so as to maintain contact at the points $x$ and $y$.

Preferably the container wall is indented at 17 to overlie the adjacent portion of the ring and hold it frictionally in place against rattling or unintentional removal. When it is desired to remove the ring to clean the container, the ring may readily be sprung to move past projection 17.

The bottom of body 10 is deformed at 18 to provide a support for a food rack or basket 19. Also in the bottom of body 10 is an outlet opening 25 having flanged edges protruding upward, as indicated at 26, forming a depressed portion 27 between the deformed section 18 and the said flanged edges 26. Said flanged edges 26 are below the level of the top of the rack supporting portion 18. Preferably the basket or food rack does not contact the side of container 10 or the heating ring 20.

Heating unit 20 is composed of a suitable metal tube 30 attached to the terminal support plate 31. Tube 30 incloses the insulated heating element 32, the ends of which are connected to terminals 33 that pass through the support plate 31 and are shrouded by the shield 21 which will receive an ordinary extension cord plug (not shown).

Terminals 33 provide a ready means for anchoring shield 21 securely to support plate 31 thereby forming an independent unit of heating ring 20 that is readily removable from container body 10.

There also is provided a snap cover 34 to enclose the terminal connections.

When moisture is desired to eliminate the drying-out effect of the items heated, a small amount of water may be placed in the depressed portion 27. Excess water will overflow flanges 26 and pass out the opening 25 before reaching the food item in the basket 19.

Items heated in this manner are heated by radiation and not by conduction. The heating unit may be readily removed from the container, without releasing any securing devices, to facilitate thorough scouring of the container without short circuiting or otherwise injuring the unit, or permit the use of the container without the heating feature.

An advantage provided in this device is that the heating unit is supported inside the container and surrounds the food rack, and is remote from the liquid reservoir, thereby exposing the entire surface of the heating element to the interior of the container and reducing heat conduction through the walls of the container.

The heating unit may be formed in different sizes and shapes for use with other types of containers or independently of a container.

The exclusive use of such modifications of this invention as come within the scope of the claims is contemplated.

What is claimed is:

1. In combination with a bowl-shaped container as described, a food rack of substantially the same shape as the container but slightly smaller so as to be received therein, and an electrical heating unit between said rack and the inner side wall of the container and surrounding the rack, elements on the side wall of the container freely supporting said unit, the latter being readily removable from the container by being lifted from said elements.

2. In a cooking or warming container provided with a shallow liquid reservoir, a food rack, an overflow means to keep the liquid level in said container below said rack, a removable heating unit inside said container and between said rack and the container side wall.

3. In combination with a container having a body portion, a removable food rack, said body portion forming a liquid reservoir in said container below said rack, a readily removable electrical heating unit inside said container and surrounding said food rack and remote from said liquid reservoir.

4. In combination, a container of the class described having a downwardly and inwardly inclined wall provided with a restricted opening and with an inward projection spaced from said opening, and a heating unit within the container having a plug attaching portion extending through said opening, said unit being supported on said wall and the edge of said opening and yieldingly retained by said projection, said unit being readily removable from said container by slight distortion to pass by said projection and by withdrawing the portion projecting through said opening.

5. In combination, a container of the class described, an electrical heating unit extending around the inner periphery of said container, and a food carrying rack carried by said container within said heating unit, said rack and unit being readily removable from said container to facilitate cleaning of the container and the use of the container without the heating unit.

6. In a cooking or warming container having a wall forming a liquid reservoir, a food rack received in said container and spaced from the container wall, and a removable heating unit inside the container and between said rack and the container wall, the container wall being provided with overflow means below the level of said unit.

7. In combination with a container of the class described having a side wall provided with a restricted opening, a heating unit within the container having a plug-attaching part extending through said opening and supported by the lower edge thereof, said unit having a portion spaced from said part and freely supported on the container wall, said unit being readily removable from the container by lifting said portion and withdrawing said part through said opening.

8. In combination with a container of the class described having a downwardly and inwardly inclined wall provided with a restricted opening, a heating unit within the container comprising a ring-like member having a plug-attaching part extending through said opening and supported on the lower edge thereof and having a portion spaced from said part in yielding abutment with the container wall whereby the unit is supported in the container but is readily removable therefrom by being sprung to free said portion from the wall to permit its lifting and by withdrawing said part inwardly through said opening.

PAUL J. McCULLOUGH.